US007289123B2

(12) United States Patent
Duggan et al.

(10) Patent No.: US 7,289,123 B2
(45) Date of Patent: Oct. 30, 2007

(54) SIMPLIFYING COMPLEX CHARACTERS TO MAINTAIN LEGIBILITY

(75) Inventors: Michael J. Duggan, Kirkland, WA (US); William Hill, Carnation, WA (US); Gregory C. Hitchcock, Woodinville, WA (US); Beat Stamm, Redmond, WA (US); Geraldine G. Wade, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 10/954,725

(22) Filed: Sep. 30, 2004

(65) Prior Publication Data

US 2006/0066619 A1    Mar. 30, 2006

(51) Int. Cl.
*G06T 11/00* (2006.01)

(52) U.S. Cl. .................. 345/469; 345/467; 345/948; 715/542

(58) Field of Classification Search ................ 345/467, 345/947, 948; 715/542
See application file for complete search history.

(56) References Cited

U.S. PATENT DOCUMENTS

| 5,526,476 | A | * | 6/1996 | Motokado et al. .......... 345/471 |
| 5,586,241 | A | * | 12/1996 | Bauermeister et al. ...... 345/467 |
| 5,598,520 | A | | 1/1997 | Harel et al. ................. 345/469 |
| 5,684,510 | A | | 11/1997 | Brassell et al. ............. 345/443 |
| 5,740,456 | A | | 4/1998 | Harel et al. ................. 715/518 |
| 5,982,387 | A | * | 11/1999 | Hellmann .................... 345/469 |
| 6,181,835 | B1 | | 1/2001 | Hamill ........................ 382/299 |
| 6,195,473 | B1 | | 2/2001 | Zable et al. ................. 382/299 |
| 6,760,028 | B1 | * | 7/2004 | Salesin et al. .............. 345/469 |
| 2003/0043151 | A1 | * | 3/2003 | Choi et al. .................. 345/467 |

OTHER PUBLICATIONS http://web.archive.org/web/20031205030933/http://www.unicode.org/standard/WhatIsUnicode.html; Apr. 18, 2003.*
Karow, P. "Digital Typefaces", Springer-Verlag Berlin Heidelberg, 1994. pp. 192.*
"Microsoft Computer Dictionary", Microsoft Press, 2002. pp. 191.*
Su, Sara L. et al., "A Hybrid Approach to Rendering Handwritten Characters", Journal of WSCG 2004, vol. 12, No. 1-3, Feb. 2-6, 2003.*

(Continued)

*Primary Examiner*—Kee M. Tung
*Assistant Examiner*—Michelle K Lay
(74) *Attorney, Agent, or Firm*—Workman Nydegger

(57) ABSTRACT

Methods, systems, and computer program products for adding hinting instructions to a character in order to improve a character bitmap produced from an outline of the character at a certain size and output resolution when the character outline is scan converted. A character is retrieved to be output. A determination is made that the character belongs to a semantic character classifications, and hinting instructions that are associated with the semantic character classification are accessed. The hinting instructions preserve semantic meaning for the character while altering either stroke presence, stroke location, or both for at least one stroke of at least one feature of the character based on a reference character size and output resolution. If the actual character size and output resolution for the character is within a reference character size and output resolution for the hinting instructions, the hinting instructions are executed.

40 Claims, 7 Drawing Sheets

OTHER PUBLICATIONS

Breckenridge, J., "Inside Hiragino: A Closeup of Apple's OS X Japanese Font," *Seybold Report Analyzing Publishing Technologyies*, Dec. 30, 2002, vol. 3, No. 18, pp. 9-15.

Ye Y. et al., "Chinese TrueType Font Support in X Window," *Journal of Computer Science and Technology (English Language Edition)*, Jan. 1999, vol.14, No. 1, pp. 27-33.

Ye, Y. et al., "The Implementation of Chinese TrueType Font Renderer for X Server," *Chinese Journal of Advanced Software Research*, 1998, vol. 5, No. 2, pp. 111-120.

Zhigeng, P. et al., "The Automatic Generation Algorithm for the Dynamic Chinese Font," *Acta Automatic Sinica*, 1997, vol. 9, No. 1, pp. 39-45.

Wong, P.Y.C. et al., "Designing Chinese Typeface Using Components," Proceedings Nineteenth Annual International Computer Software and Applications Conference (COMPSAC'95), Aug. 9-11, 1995, Cat. No. 95CB35838, pp. 416-421.

Xiaohu, M. et al., "The Automatic Generation of Chinese Outline Font Based on Stroke Extraction," *Journal of Computer Science and Technology (English Language Edition)*, Jan. 1995, vol. 10, No. 1, pp. 42-52.

Yunmei, D. et al., "A Parametric Graphics Approach to Chinese Font Design," *Raster Imaging and Digital Typography II*, 1991, pp. 156-165.

Moon, Y. S. et al., "Deficiencies of Postscript in Displaying/Printing Chinse Fonts," *Communications of COLIPS*, Oct. 1991, vol. 1, No. 1, pp. 12-20.

Moon, Y. S. et al., "Efficient Construction of High Quality Chinese Font Libraries," 1988 International Conference on Computer Processing of Chinese and Oriental Languages Proceedings, Aug. 29-Sep. 1, 1998, pp. 262-265.

Lim, S., "Oriental Character Font Design by a Structured Composition of Stroke Elements," *Computer Aided Design*, Mar. 1995, vol. 27, No. 3, pp. 193-207.

Chang, K. et al., "A Shrinking Method for Chinese Characters Font Generation Using Topology Relation," *Computer Processing of Chinese & Oriental Languages*, Dec. 1992, vol. 6, No. 2, pp. 159-167.

Durst, M., "Structured Character Description for Font Design: A Preliminary Approach Based on Prolog," pp. 1-12.

* cited by examiner

SIMPLIFYING COMPLEX CHARACTERS TO MAINTAIN LEGIBILITY

CROSS-REFERENCE TO RELATED APPLICATIONS

N/A

BACKGROUND OF THE INVENTION

1. The Field of the Invention

The present invention relates to character legibility. More specifically, the present invention relates to adding hinting instructions to a character in order to improve a character bitmap produced from an outline of the character at a certain size and output resolution when the character outline is scan converted.

2. Background and Related Art

FIG. 1 illustrates a character outline 100. A character outline is a mathematical description of a characters shape using lines and curves. Character outline 100 includes a feature 120 that is made up of strokes 121-126, and includes strokes 111-112 and 131-133. Identifying strokes 121-126 as feature 120 is a somewhat arbitrary designation that will be described in more detail below with respect to various embodiments of the present invention. For now, it is sufficient to understand that a feature is a collection of one or more strokes for a character.

FIG. 2 shows a bit map 200 of character outline 100 scaled to a grid of sixty pixels. Similar to character outline 100, bit map 200 includes a feature 220 that is made up of strokes 221-226, and includes strokes 211-212 and 231-233. FIG. 2 illustrates that when sufficient pixels are available for a character of a particular size, rendering can be a relatively straightforward and simple process.

Consider, however, the size of the bit map 200 on various output devices. Even the least expensive of current laser printers offer resolutions of 300 dots per inch (DPI), with 600 being more common. While uncommon for laser printers, resolutions greater than 2400 DPI are not uncommon for ink-jet printers. Accordingly, if rendered on a 300 DPI laser printer, bit map 200 would be ⅕th of an inch high.

Typical display devices, however, have much lower resolutions. For example, monitor resolutions of about 100 to 133 pixels per inch (PPI) are considered high, with resolutions of 72 PPI being fairly common. As a result, if rendered on a high resolution monitor, bit map 200 would be approximately ½ of an inch high.

It is generally accepted that the optimum reading size for characters is between about nine and twelve points. A point is approximately 1/72nd of an inch. Converting point size to inches, optimum reading size for characters is therefore about ⅛th of an inch to about ⅙th of an inch.

As indicated above, if rendered on a 300 DPI laser printer, bit map 200 would be ⅕th of an inch high, which is large for reading, but not unreasonably so. However, as also noted above, if rendered on a high resolution monitor, bit map 200 would be approximately ½ of an inch high, which is far too large for effective reading.

In order to make character outline 100 into a bit map for optimal reading on the 72 PPI monitor, character outline 100 would need to be scaled to a grid of twelve pixels, as shown in FIG. 3. On a 72 PPI monitor, bit map 300 would be ⅙th of an inch high. Note, however, that when character outline 100 is scaled to a grid of twelve pixels, there are not enough pixels to accurately represent the shape of the character.

Similar to bit map 200, bit map 300 includes a feature 320 that is made up of strokes 321-326, and includes strokes 311-312 and 331-333. As shown in FIG. 3, however, the shape of the character appears to be broken, with clashing pixels and block spots. For example, there is not white space between strokes 322 and 324A and between strokes 326 and 332.

As shown in the basic bit map 400 of FIG. 4, fourteen pixels in the vertical direction are about the minimum number required to accurately represent character outline 100, given: one pixel for the top of stroke 411, one pixel for stroke 412, one pixel for the separation between stroke 412 and 422, one pixel for stroke 422, one pixel for the separation between stroke 422 and stroke 424A, one pixel for stroke 424A, one pixel for the separation between stroke 424A and stroke 424B, one pixel for stroke 424B, one pixel for the separation between stroke 424B and 426, one pixel for stroke 426, one pixel for the separation between stroke 426 and stroke 432, one pixel for stroke 432, two pixels for strokes 431 and 433. Of course, the minimum number of pixels required to represent a character accurately varies from one character to another.

Roughly, the distance in the vertical direction from the top of the highest character to the bottom of the lowest character in a font is defined as an "em." There also can be some padding, and some font characters may exceed an em. An em is not a unit of measure, but rather a shorthand description for this distance. The number of pixels per em is helpful in determining whether the character shape problems illustrated in FIG. 3 are likely to occur. At sixty pixels per em (FIG. 2) character shape problems are less likely to occur than at twelve pixels per em (FIG. 3).

Returning back to FIG. 4, if fourteen pixels are not available in the vertical direction, the character may be altered to improve legibility. It should be noted that although FIG. 4 shows insufficient pixels in the vertical direction, the problem of insufficient pixels to represent a character applies in the horizontal direction as well. One way to alter a character to improve legibility is to remove strokes from the character. An Asian character was selected for character outline 100 for purposes of illustration because Asian characters, as compared to Latin characters, tend to have a large number of strokes, and therefore generally are more susceptible to the shape problems, whether in the horizontal or vertical direction, illustrated in FIG. 3 at character sizes suited to effective reading. Naturally, Latin and other characters are susceptible to the same shape problems, depending on the number of strokes in the character outline, the target size for the character, resolution of the output device, and so forth.

Removing a stroke from an Asian character is roughly analogous to removing a letter from an English word. For many English words, removing a letter would not make the word unrecognizable, particularly in the context of surrounding words. Of course, certain letters have more impact than others—removing vowels in the middle of a word is likely to cause fewer problems than removing a consonant at the beginning of a word. Similarly, removing a stroke from an Asian character can reduce the number of pixels needed to represent the character, without impacting legibility in too great of a degree. Like removing letters from an English word, however, the stroke to be removed from an Asian character should be selected to minimize any potential reduction in readability.

As a result, rather than scaling the character outline 100, traditional Asian fonts include multiple bit maps, created by the font developer, for rendering characters at different font sizes. The stroke-reduced bit map 500 illustrated in FIG. 5 is an example bit map for the character outline 100 illustrated in FIG. 1. Note that strokes 124A and 124B have been collapsed into a single stroke 524 to improve legibility. The remaining strokes, 511, 512, 521, 522, 523, 526, and 531-533 are largely unchanged.

While the solution illustrated if FIG. 5 addresses the character shape problem shown in FIG. 3, providing multiple bit maps for each character significantly increases the resources required to develop an Asian font and significantly increases the storage requirements needed for the font. Consider, for example, that an Asian font may contain more than 20,000 distinct characters. In providing multiple bit maps for each character, the number of bit maps for a single Asian font may exceed 400,000. As a result, developing an Asian font may require the equivalent of 50 font designers working for a full year.

Therefore, methods, systems, and computer program products for adding hinting instructions to a character in order to improve legibility of a scaled character bitmap produced from an outline of the character at a certain size and output resolution when the character outline is scan converted.

BRIEF SUMMARY OF THE INVENTION

The present invention extends to methods, systems, and computer program products for adding hinting instructions, in some instances automatically, to a character in order to improve a character bitmap produced from an outline of the character at a certain size and output resolution when the character outline is scan converted.

In accordance with an example method embodiment of the present invention a character to be output is retrieved, the character comprising one or more features, each of which further comprises one or more strokes. The method determines that the character belongs to one or more semantic character classifications and accesses one or more hinting instructions that are associated with each of the one or more semantic character classifications. The one or more hinting instructions preserve semantic meaning for the character while altering either stroke presence, stroke location, or both for at least one stroke of at least one feature of the character based on a reference character size and output resolution. The actual character size and output resolution for the character is compared to the reference character size and output resolution for the one or more hinting instructions, and the one or more hinting instructions are executed to alter either stroke presence, stroke location, or both for the at least one stroke of the at least one feature of the character to produce a hinted character outline.

A scaled character bit map may be created from the hinted character outline and sent to a display device or printer. In some embodiments, the character is from an East Asian language.

In accordance with another example computer program product embodiment of the present invention a set of characters to be output are received, each character comprising one or more features with one or more strokes. For each character in the set of characters, one or more semantic character classifications to which the character belongs and one or more hinting instructions that are associated with the semantic character classification are identified. The one or more hinting instructions preserving semantic meaning for the character while altering either stroke presence, stroke location, or both for at least one stroke of at least one feature of the character based on a reference character size and output resolution. The one or more hinting instructions are associated with the character.

The one or more hinting instructions that are associated with the character may be based on a Unicode value, or some other encoding, for the character, and the set of characters may comprise at least a portion of a font. For example, the set of characters may be one or more characters from an East Asian language. It should be noted that a character may belong to a plurality of semantic character classifications, that a different reference character size and output resolution may apply to different hinting instructions, and that some hinting instructions may be associated with a character that is specific to only that character.

The method also may further comprise developing the one or more semantic character classifications and defining the one or more hinting instructions for each of the one or more semantic character classifications.

In accordance with another example method embodiment of the present invention a character outline that comprises one or more features, each of which further comprises one or more strokes, and one or more reference character sizes and output resolutions are defined. An actual character size and output resolution for the character is compared to the one or more reference character sizes and output resolutions. One or more hinting instructions for the character, as opposed to one or more stroke-reduced bit maps, are defined, to be executed if the actual character size and output resolution falls within one of the reference character sizes and output resolutions. The one or more hinting instructions preserve semantic meaning for the character while reducing at least one stroke of at least one feature of the character to improve character legibility.

If the actual character size and output resolution falls within one of the reference character sizes and output resolutions, the one or more hinting instructions may collapse a stroke, partially collapse the stroke, shorten the stroke, and so forth. The stroke may be any character stroke, including a horizontal stroke, a vertical stroke, or an angled stroke.

The reference character sizes and output resolutions may be expressed as a target point size and output resolution, as pixels per em, or in any other suitable measure.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for adding hinting instructions to a character in order to improve a character bitmap produced from an outline of the character at a certain size and output resolution when the character outline is scan converted. It should be noted here that the various disclosed embodiments may focus on different aspects of the present invention for purposes of illustration and clarity. Accordingly, the disclosed embodiments should not be used to limit the scope of the present invention, and therefore combinations of the disclosed embodiments and/or certain portions of the disclosed embodiments should be understood to be included within the scope of the present invention.

Figure 1:
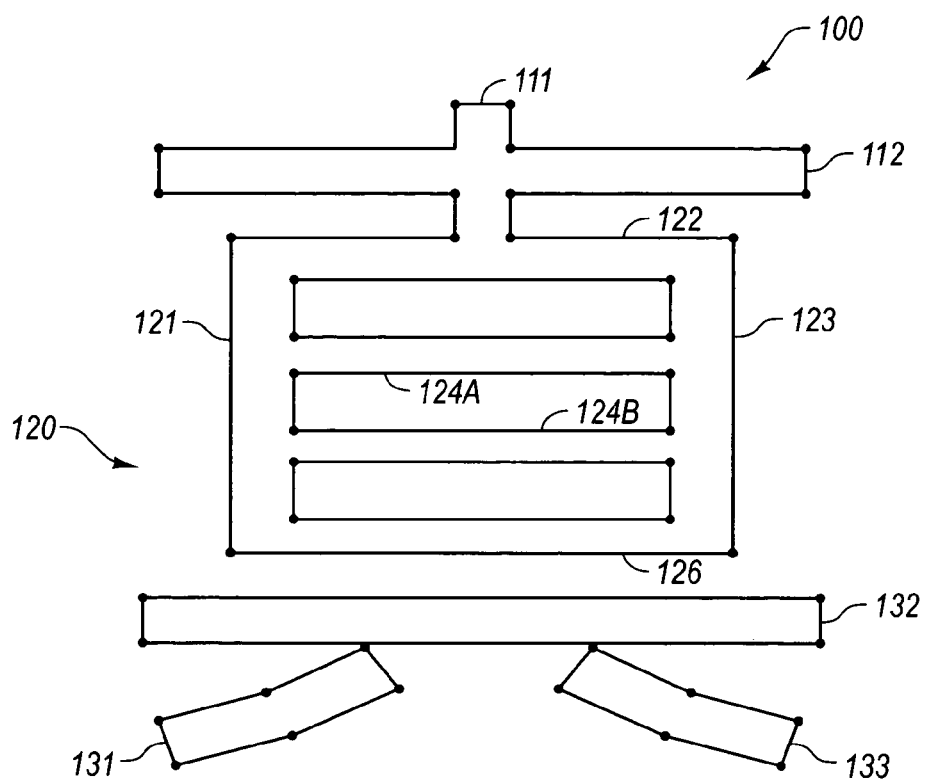
FIG. 1 illustrates a character outline for a character.
Figure 2:
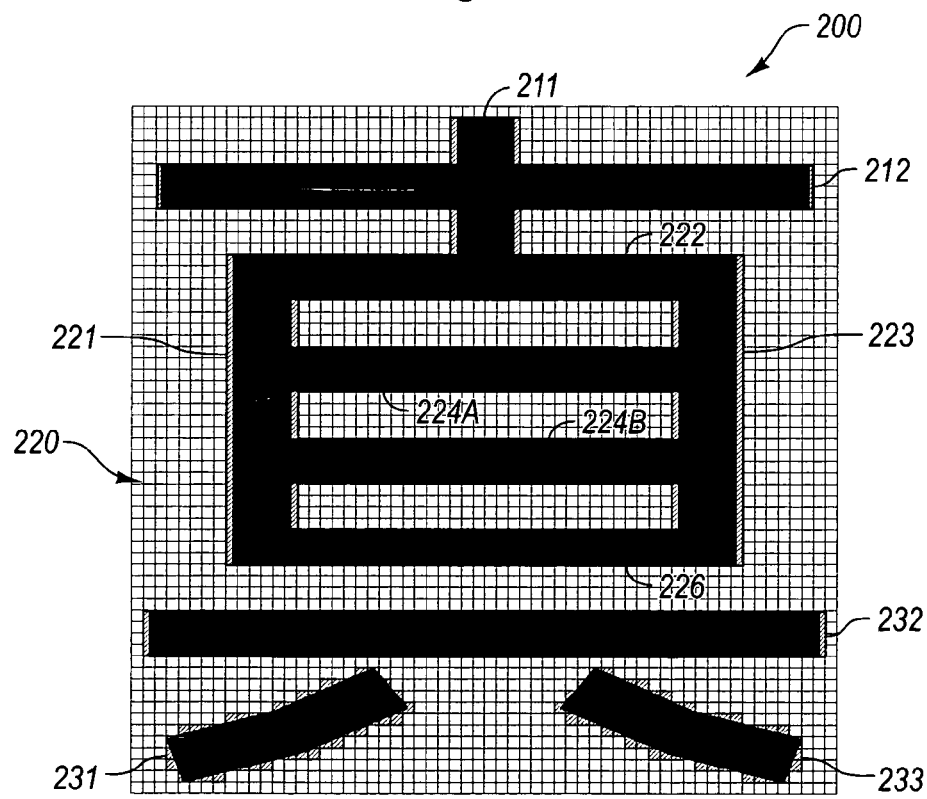
FIG. 2 shows a bit map representation of the character outline illustrated in FIG. 1 scaled to a 60-pixel grid.
Figure 6:
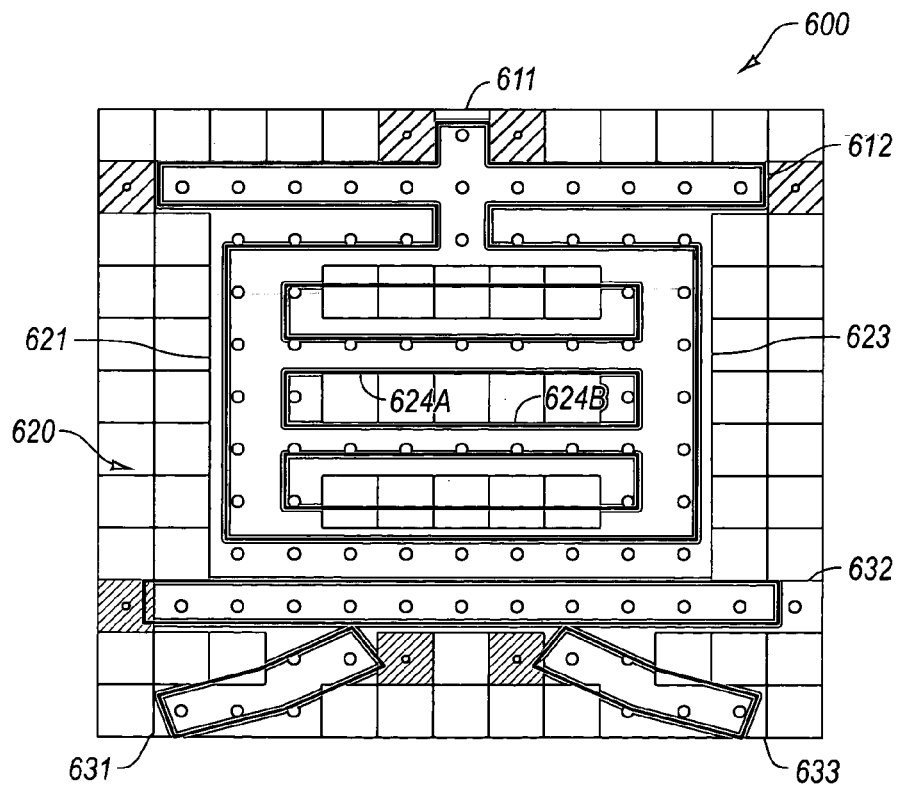
FIG. 6 shows a scaled bit map of the character outline illustrated in FIG. 1 that has used hinting for grid-fitting.

FIG. 6 shows a scaled bit map 600 of the character outline illustrated in FIG. 1 that has used hinting for grid-fitting purposes. Grid-fitting using hinting instructions that describe how to fit a character outline to the grid prior to determining which pixels should be on. Grid-fitting attempts to preserve the regularity or near-regularity of locations and distances, preserve proportions. In FIG. 6, note that the horizontal 612, 622, 624A, 624B, 626, and 632 have been fit to the twelve-pixel grid so that the stroke outlines lie along a single pixel. Grid fitting usually occurs along one axis first, and then along the second axis.

Figure 4:
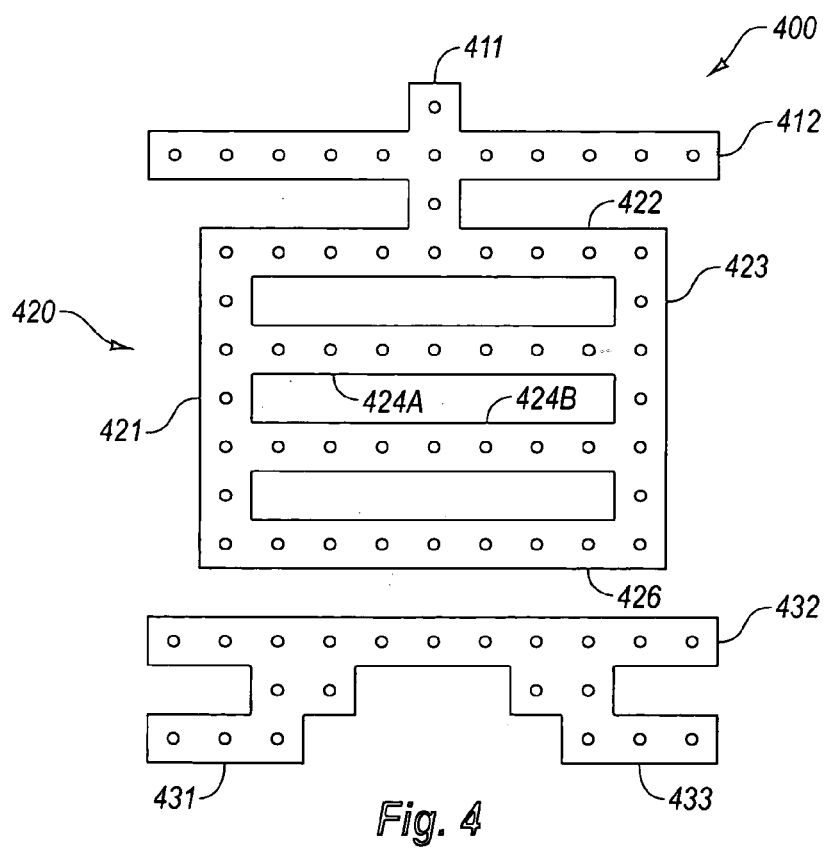
FIG. 4 shows the number of pixels needed in the vertical direction to accurately represent the character outline illustrated in FIG. 1.

The grid-fitting illustrated in FIG. 6 improves the shape of the character, but does not solve the problem of black spots in the image. Referring back to FIG. 4, the reason for this is that a minimum of fourteen pixels are needed to accurately represent character outline 100. In order to improve the shape of the bit map 600, additional hinting is performed to collapse one of the middle strokes 624A or 624B of feature 620.

Figure 7:
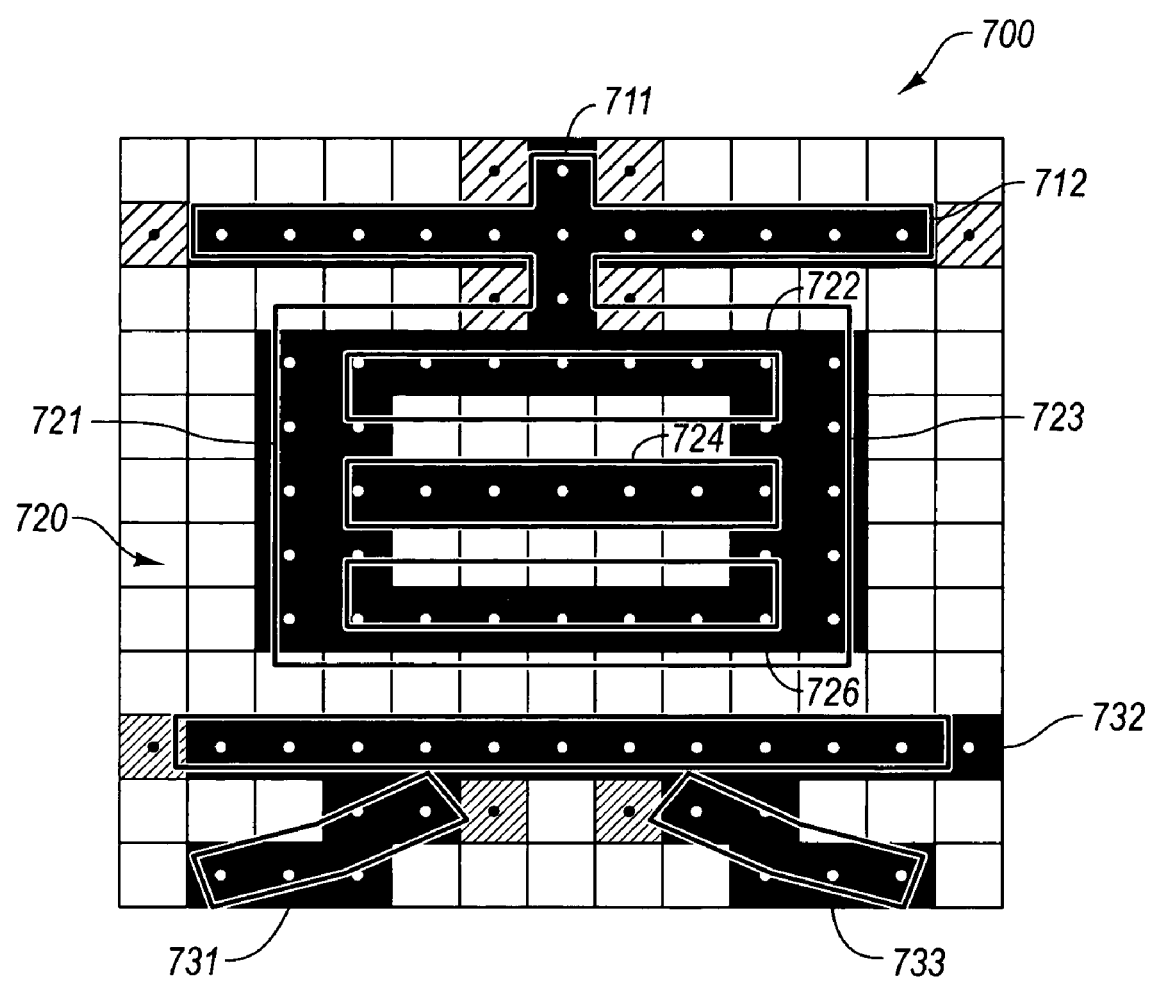
FIG. 7 shows a scaled bit map of the character outline illustrated in FIG. 1 that has used hinting for both grid-fitting and stroke reduction.

This additional hinting is illustrated in the bit map 700 shown in FIG. 7. Note in particular that one of the horizontal strokes 624A and 624B of feature 620 has been collapsed into a single horizontal stroke 724 of feature 720. As a result, the character is more legible, specifically due to the white space between horizontal strokes 712, 722, 724, 726, and 732.

Figure 3:
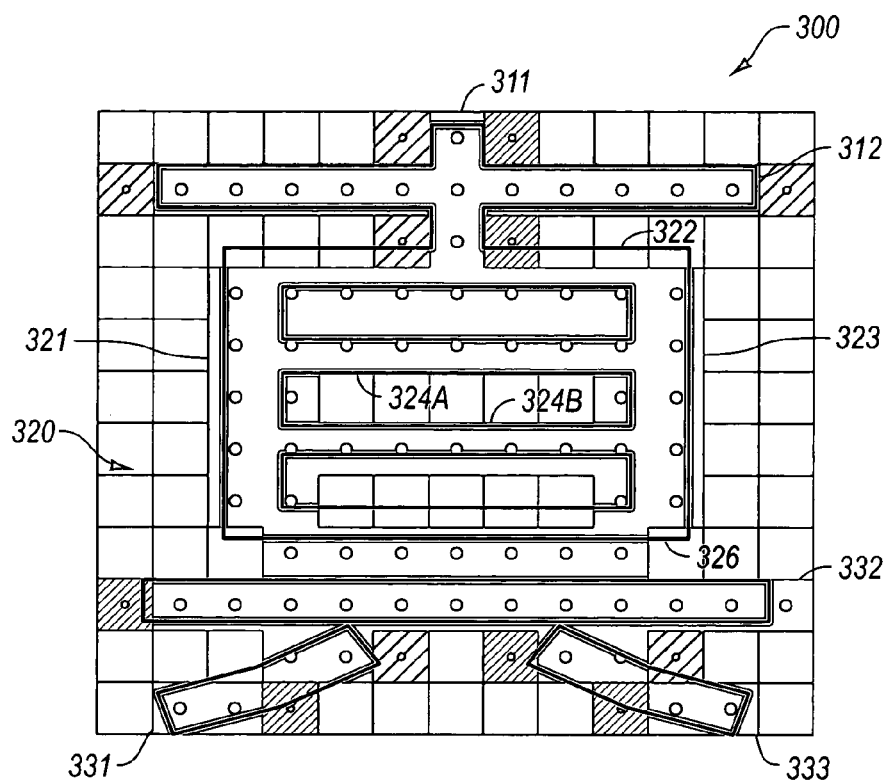
FIG. 3 shows a bit map representation of the character outline illustrated in FIG. 1 scaled to a 12-pixel grid.
Figure 5:
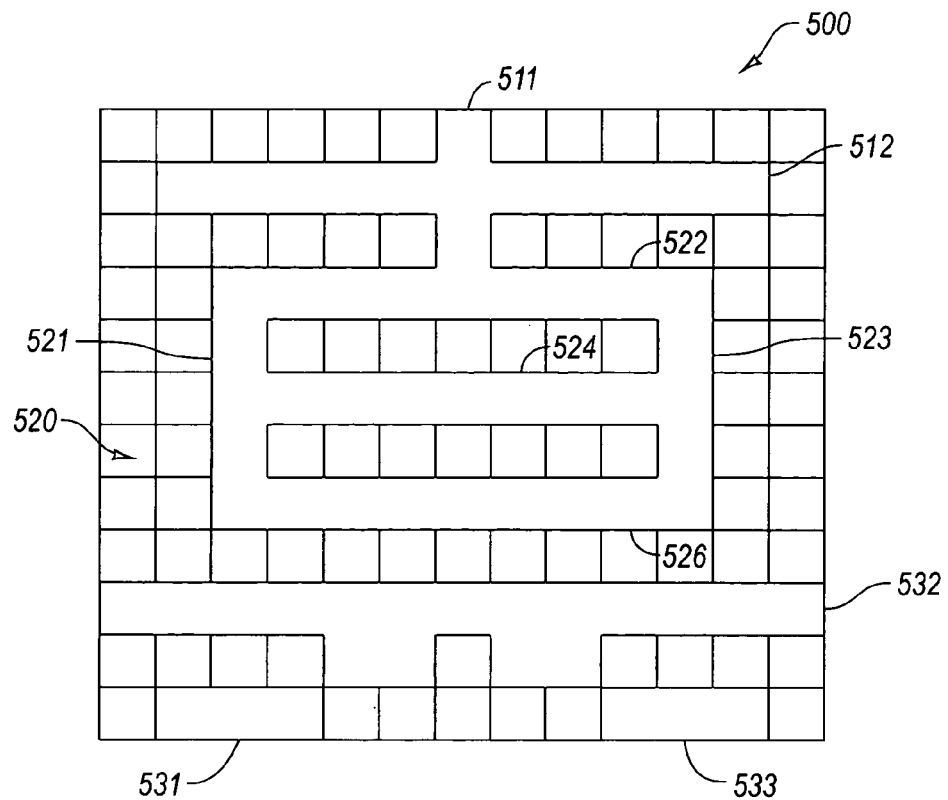
FIG. 5 shows a stroke-reduced bit map, created by the font designer, for the character outline illustrated in FIG. 1.

There are a variety of font languages that support hinting instructions, including TRUETYPE®, which is commonly used by Apple and Microsoft. Font languages are used to describe character outlines, such as character outline 100, in order to facilitate scaling, and for hinting. However, as indicated above, hinting has not been used for reducing strokes in scaled character outlines for Asian fonts, and more specifically for East Asian (i.e., Japan, simplified and traditional Chinese, Korea, etc.) fonts, due to the difficulties described above and illustrated in FIG. 3. Rather, character outlines are used for rendering characters where there are sufficient pixels per em to accurately represent the characters, and, when there are insufficient pixels per em to accurately represent the character, either (i) rendered characters offer poor legibility, similar to the character bit map 300 illustrated in FIG. 3, or (ii) multiple stroke-reduced bit maps for each character (see FIG. 5) are embedded in the font itself, leading to large font development costs and large font files. In contrast, using the hinting described above, the same highly legible results of multiple bit maps can be matched, and thereby eliminate the need to develop and embed stroke-reduced bit maps inside a font file.

For example, in developing a font, a character outline is defined. The character outline includes one or more features made up of one or more strokes. It should be kept in mind that a feature is simply an arbitrary designation for a collection of one or more strokes, and does not necessarily imply any further structure on the character outline.

One or more reference character sizes and output resolutions also are defined. The reference character sizes and output resolutions indicate character sizes and output resolutions where stroke reduction should occur. For some characters, no stroke reduction may be required, whereas others may require stroke reduction at one particular character size and output resolution or at multiple character sizes and output resolutions. As indicated previously, the reference character sizes and output resolutions may be expressed as a target point size and output resolution, as pixels per em, or in any other suitable measure.

At development time, a variable for an actual character size and output resolution for the character is compared to the one or more reference character sizes and output resolutions. This variable receives the actual character size and output resolution at runtime.

As opposed to using one or more stroke-reduced bit maps, one or more hinting instructions for the character are defined, to be executed if the actual character size and output resolution falls within one of the reference character sizes and output resolutions. Again, the one or more hinting instructions preserve semantic meaning for the character while reducing one or more strokes of one or more character features improve character legibility. If the actual character size and output resolution falls within one of the reference character sizes and output resolutions, the one or more hinting instructions may collapse a stroke, partially collapse the stroke, shorten the stroke, and so forth. The stroke may be any character stroke, including a horizontal stroke, a vertical stroke, or an angled stroke.

A further reduction in font development resources can be achieved by recognizing that certain features are present in multiple characters so that hinting may be added automatically. As indicated above, a character feature is simply an arbitrary collection of one or more character strokes. The primary reason for using the term "feature". is a desire to facilitate the discussion of semantic character analysis that follows. In other words, a character feature does not necessarily have any significance outside of semantic character analysis.

While at one level, some benefits may be realized by noticing visual similarities between character features, additional benefits may be realized by considering the semantic significance of altering a character feature. In other words, while hinting could be implemented simply based on visual perception, basing hinting instructions on semantic rather than only visual similarity, leads to better legibility. Semantic analysis does not necessarily imply that similar features mean the same thing from one character to another, but that similar hinting, such as stroke reduction or movement, may be performed on different characters without altering the characters' meaning or legibility, to a significant degree. Throughout the Specification, Drawings, and Claims, the term "stroke reduction" should be interpreted broadly to include, but not be limited to, total removal (collapsing) of a stroke, partial removal (collapsing) of a stroke, or shortening a stroke in the horizontal and/or vertical direction. As described in further detail below, stroke reduction is intended to keep both the semantic meaning and legibility of a character viable at differing character sizes and resolutions.

The semantic analysis involves defining one or more semantic character classifications. Again, these classifications do not necessarily indicate that characters have similar meanings, but rather that similar hinting may be performed on features common to the characters in a semantic classification, in order to improve legibility. It may be that the features, even though they look similar, have entirely different semantic significance. For example, a character feature may have no semantic significance at all because it is part of a larger character feature with semantic significance. Care also should be taken to assure that removing strokes does not make it too difficult for a reader to distinguish between characters.

A single character may fall into multiple semantic character classifications, and therefore multiple, and possibly independent hinting instructions may be executed or performed on a single character. In some embodiments, a character may be restricted to a single semantic classification in order to simplify hinting. In other embodiments, a character that fall into multiple semantic classifications may include additional checks within the hinting language itself to confirm that after one type of hinting has been performed, the character still fall into the other semantic classifications. Alternatively, the semantic classifications themselves may identify any incompatibilities between them and their associated hinting, so that only compatible types of hinting are performed. For example, incompatibilities could be identified explicitly by having one or more semantic classifications exclude one or more other semantic classifications, or may be implied by having one or more semantic classifications identify one or more compatible semantic classifications.

Although most of the description above has focused on Asian fonts, it should be recognized that Asian fonts simply include characters that are somewhat predisposed to the identified problems because of the number of strokes they contain. The number of strokes, the white space needed to separate the strokes, the typical resolution of display devices, and the font sizes most favorable to readability make Asian fonts particularly problematic. However, these same problems may be encountered with any characters under the right circumstances.

One way to quantify when the character shape problems identified above are likely to occur is to consider the complexity of a character. Here, complexity refers to a character in the context of a character size and resolution, as opposed to simply the number of strokes present in a character. Accordingly, although the bit map 200 corresponds to a character with a large number of strokes, the character is not complex because there are an adequate number of pixels, a 60-pixel grid in this case, to represent the character. When the character outline 100 is scaled to a 12-pixel grid, such as the one shown in FIG. 3, however, the character becomes complex because there are not enough pixels to represent the character accurately.

In a practical sense, there is a correlation between the number of pixels per em, a particular font, and the output resolution. Hinting is able to consider each of these factors, and therefore conditionally perform stroke reduction or movement when needed because a character is considered complex based on these factors. Accordingly, the focus on Asian characters is illustrative only, and not intended to limit the scope of the present invention.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 8:
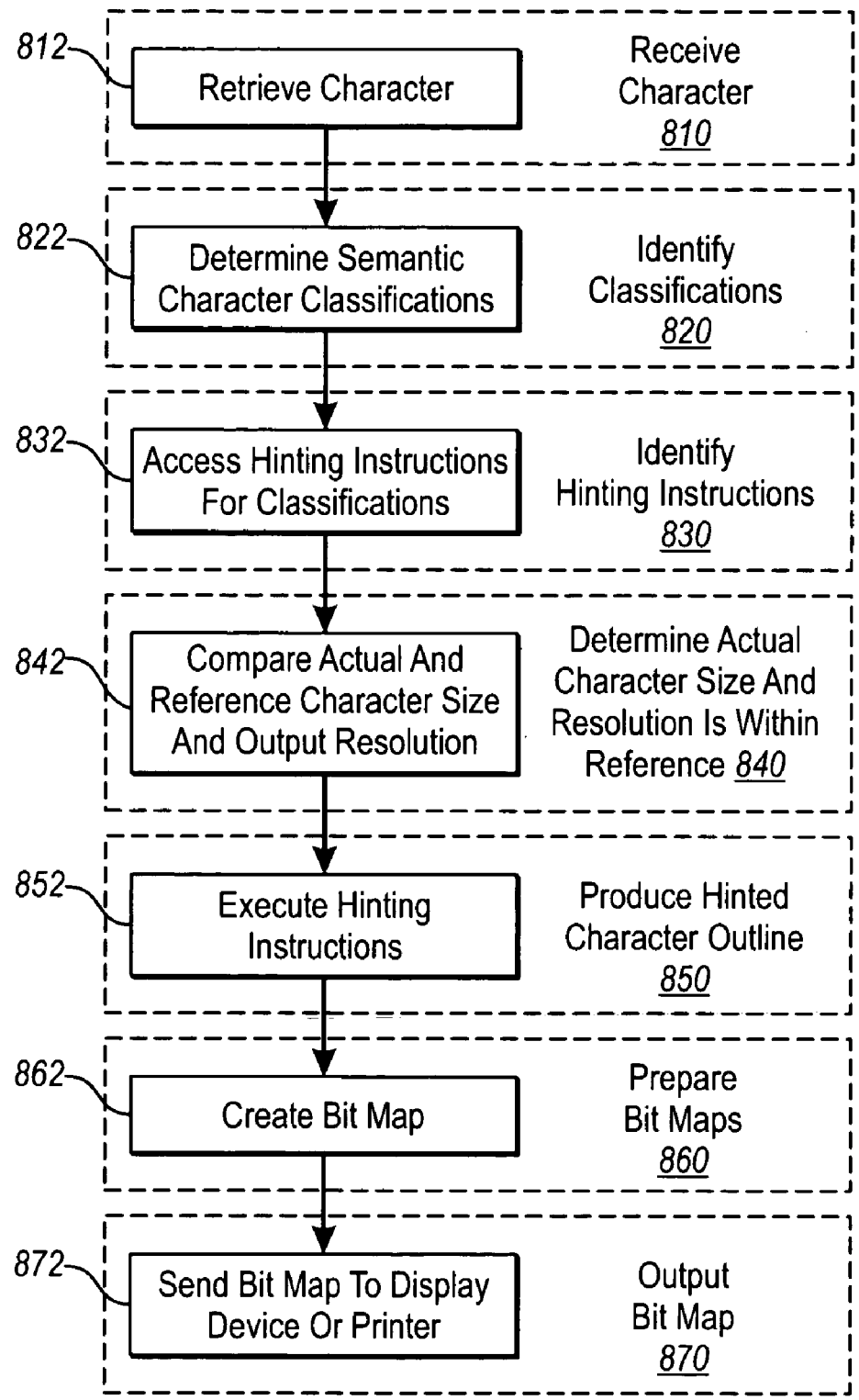
FIGS. 8 and 9 show example acts and steps for methods of adding hinting instructions to a character or set of characters.
Figure 9:
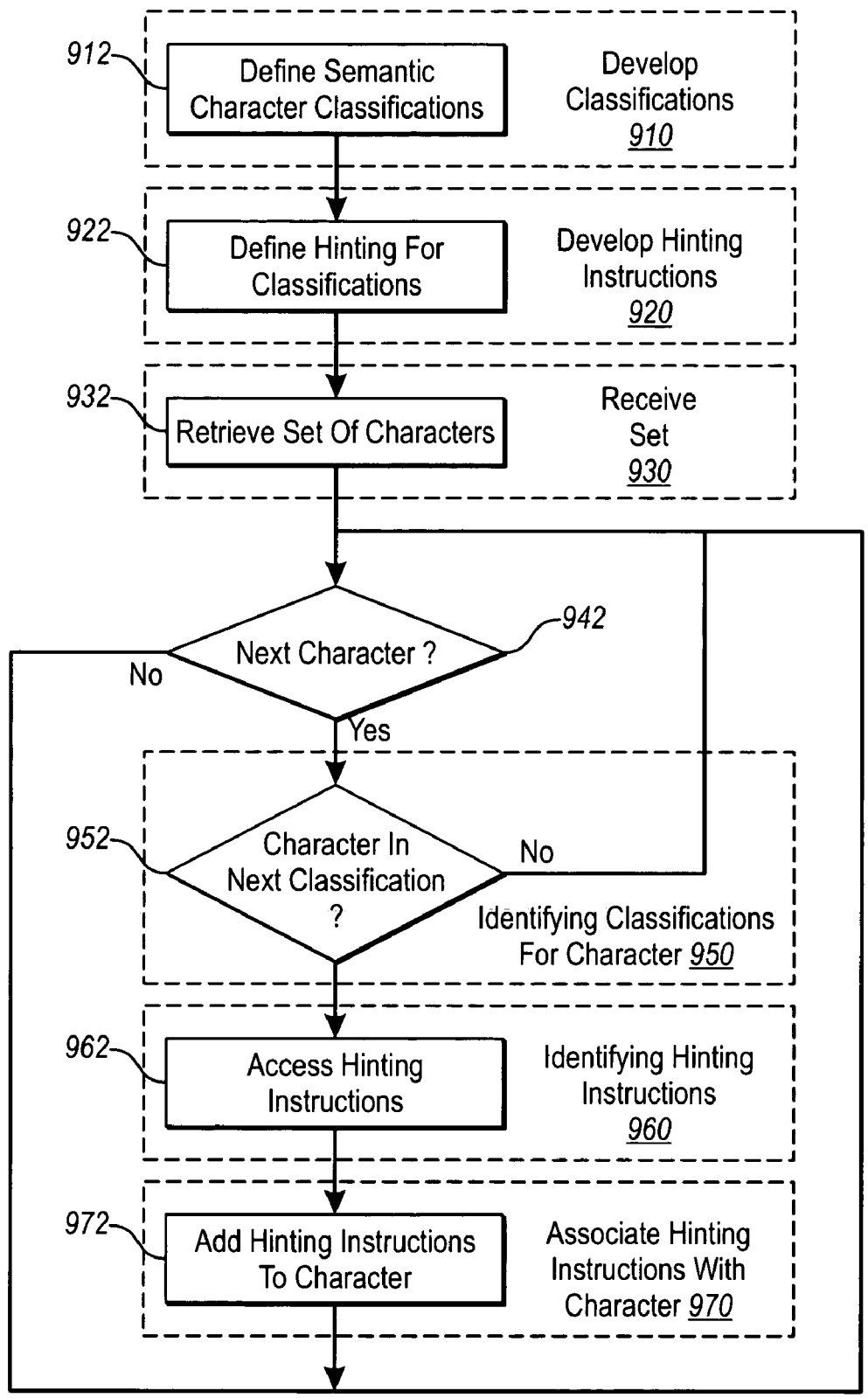

FIGS. 8 and 9 show example acts and steps for methods of adding hinting instructions to a character or set of characters. With reference to FIG. 8, a step for receiving (810) a character to be output may include an act of retrieving (812) a character to be output. For example, the characters contained within some electronic data may be retrieved one by one and processed in accordance with an embodiment of the invention described in connection with FIG. 8. As indicated above, the character may be a character from an East Asian language.

A step for identifying (820) one or more semantic character classifications for the character may include an act of determining (822) that the character belongs to one or more semantic character classifications. A step for identifying (830) one or more hinting instructions that are associated with each of the one or more semantic character classifications may include an act of accessing (832) the one or more hinting instructions. As described above, the hinting instructions preserve semantic meaning for the character while altering either the presence or location of a stroke, or both, for at least one character stroke of at least one character feature based on a reference character size and output resolution.

A step for determining (840) that an actual character size and output resolutions for the character is within the reference character size and output resolution for the one or more hinting instructions may include an act of comparing (842) the actual character size and output resolution to the reference character size and output resolution. For example, depending on the number of pixels per em, the character size, and the output resolution, hinting may not be necessary. Consider in particular, the difference between a 600 DPI printer and a 100 PPI display device. Although grid-fitting may be desirable in both cases, with six times the resolution there may not be a need for stroke reduction when printing, but stroke reduction may dramatically improve the readable of a character on the display device.

A step for producing (850) a hinted character outline by using the one or more hinting instructions may include an act of executing (852) the one or more hinting instructions. A step for preparing (860) a scaled bit map from the hinted character outline may include an act of creating (862) the bit map. A step for outputting (870) the bit map may include an act of sending (872) the bit map to an output device, such as a display device or printer.

In some embodiments, a character may belong to a plurality of semantic character classifications, whereas in others a character may be restricted to one semantic character classification. If a character belongs to multiple semantic classifications, it is possible that none, one, or multiple hinting instructions meet the reference character size and output resolution requirement. In other words, different hinting instructions may have different character size and output resolution requirements in order to be executed.

With reference to FIG. 9, a step for developing (910) one or more semantic character classifications may include an act of defining (912) the one or more semantic character classifications. A step for developing (920) one or more hinting instructions may include an act of defining (922) the one or more hinting instructions for the one or more semantic character classifications. Here too, a character may belong to a plurality of semantic character classifications.

A step for receiving (930) a set of characters to be output, each character comprising one or more features with one or more strokes, may include an act of retrieving (932) the set of characters. For example, the characters contained within font may be retrieved and processed in accordance with an embodiment of the invention described in connection with FIG. 9 in order to add hinting and semantic analysis to a font where none or limited hinting and semantic analysis existed previously. Once again, the set of characters character may be one or more characters (or even all characters) from an East Asian language font.

For each character in the set of characters (decision block 942) a step for identifying (950) one or more semantic character classifications to which the character belongs may include an act of determining (952) whether the character belong to one or more semantic character classifications. A step for identifying (960) one or more hinting instructions that are associated with the one or more semantic character classifications may include an act of accessing (962) the one or more hinting instructions that are associated with a semantic character classification if the character belongs to the semantic character classification.

As indicated above, the one or more hinting instructions preserve semantic meaning for the character while altering either stroke presence, stroke location, or both for at least one stroke of at least one feature of the character based on a reference size and output resolution. A step for associating (970) the one or more hinting instructions with the character may include an act of adding (972) the one or more hinting instructions to the character. The one or more hinting instructions may be associated with the character based on a Unicode, or other encoding system, value for the character.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 10:
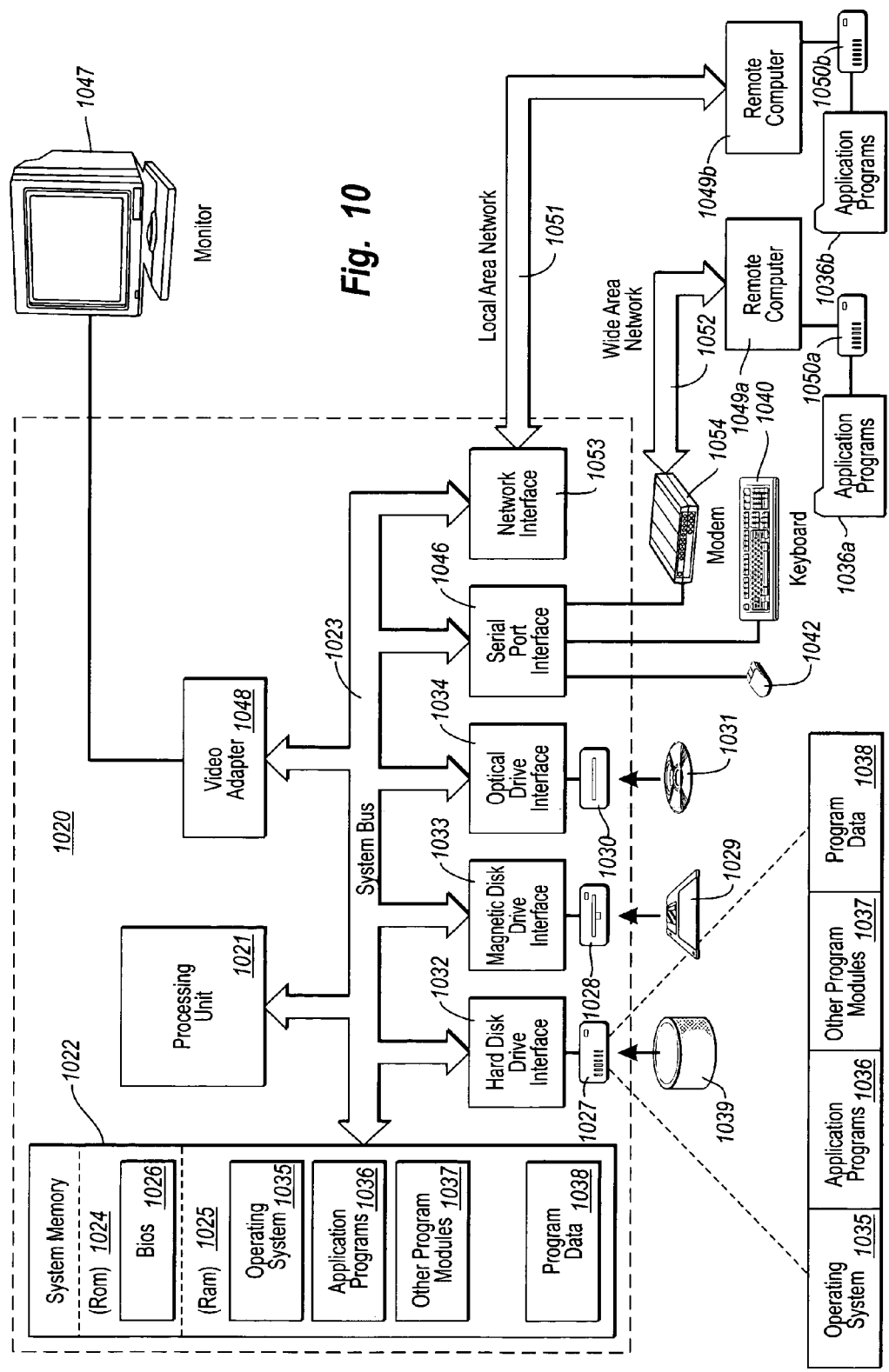
FIG. 10 illustrates an example computer system that provides a suitable operating environment for the present invention.

FIG. 10 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 10, an example system for implementing the invention includes a general purpose computing device in the form of a conventional computer 1020, including a processing unit 1021, a system memory 1022, and a system bus 1023 that couples various system components including the system memory 1022 to the processing unit 1021. It should be noted however, that as mobile phones become more sophisticated, they are beginning to incorporate many of the components illustrated for conventional computer 1020. Accordingly, with relatively minor adjustments, mostly with respect to input/output devices, the description of conventional computer 1020 applies equally to mobile phones. The system bus 1023 may be any of several types of bus structures including a memory bus or memory controller, a peripheral bus, and a local bus using any of a variety of bus architectures. The system memory includes read only memory (ROM) 1024 and random access memory (RAM) 1025. A basic input/output system (BIOS) 1026, containing the basic routines that help transfer information between elements within the computer 1020, such as during start-up, may be stored in ROM 1024.

The computer 1020 may also include a magnetic hard disk drive 1027 for reading from and writing to a magnetic hard disk 1039, a magnetic disk drive 1028 for reading from or writing to a removable magnetic disk 1029, and an optical disc drive 1030 for reading from or writing to removable optical disc 1031 such as a CD-ROM or other optical media.

The magnetic hard disk drive 1027, magnetic disk drive 1028, and optical disc drive 1030 are connected to the system bus 1023 by a hard disk drive interface 1032, a magnetic disk drive-interface 1033, and an optical drive interface 1034, respectively. The drives and their associated computer-readable media provide nonvolatile storage of computer-executable instructions, data structures, program modules and other data for the computer 1020. Although the exemplary environment described herein employs a magnetic hard disk 1039, a removable magnetic disk 1029 and a removable optical disc 1031, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 1039, magnetic disk 1029, optical disc 1031, ROM 1024 or RAM 1025, including an operating system 1035, one or more application programs 1036, other program modules 1037, and program data 1038. A user may enter commands and information into the computer 1020 through keyboard 1040, pointing device 1042, or other input devices (not shown), such as a microphone, joy stick, game pad, satellite dish, scanner, or the like. These and other input devices are often connected to the processing unit 1021 through a serial port interface 1046 coupled to system bus 1023. Alternatively, the input devices may be connected by other interfaces, such as a parallel port, a game port or a universal serial bus (USB). A monitor 1047 or another display device is also connected to system bus 1023 via an interface, such as video adapter 1048. In addition to the monitor, personal computers typically include other peripheral output devices (not shown), such as speakers and printers.

The computer 1020 may operate in a networked environment using logical connections to one or more remote computers, such as remote computers 1049a and 1049b. Remote computers 1049a and 1049b may each be another personal computer, a server, a router, a network PC, a peer device or other common network node, and typically include many or all of the elements described above relative to the computer 1020, although only memory storage devices 1050a and 1050b and their associated application programs 1036a and 1036b have been illustrated in FIG. 10. The logical connections depicted in FIG. 10 include a local area network (LAN) 1051 and a wide area network (WAN) 1052 that are presented here by way of example and not limitation. Such networking environments are commonplace in office-wide or enterprise-wide computer networks, intranets and the Internet.

When used in a LAN networking environment, the computer 1020 is connected to the local network 1051 through a network interface or adapter 1053. When used in a WAN networking environment, the computer 1020 may include a modem 1054, a wireless link, or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing communications over wide area network 1052 maybe used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of automatically executing hinting instructions for a character in order to improve a character bitmap produced from an outline of the character at a certain size and output resolution when the character outline is scan converted, the method comprising acts of:

retrieving a character to be output, the character comprising a plurality of strokes;

identifying a semantic character classification that the character belongs to, from a plurality of available semantic character classifications, wherein the available semantic character classifications each classify corresponding characters that have common features, including one of more strokes, that when modified, do not significantly alter the meaning or legibility of the characters classified by the corresponding semantic character classifications, such that the semantic character classifications are based on semantics of characters rather than mere visual similarity of character strokes;

accessing one or more hinting instructions that are associated with one or more semantic character classifications corresponding to the retrieved character, the one or more hinting instructions preserving semantic meaning for the character while altering at least one of a stroke location or stroke presence for at least one stroke of at least one feature of the character based on a reference character size and output resolution;

comparing an actual character size and output resolution for the character to the reference character size and output resolution for the one or more hinting instructions; and executing the one or more hinting instructions to alter at least one of a stroke location or stroke presence for the at least one stroke of the at least one feature of the character to produce a hinted character outline.

2. A method as recited in claim 1, wherein the one or more hinting instructions alter stroke location for the at least one stroke of the at least one feature of the character.

3. A method as recited in claim 1, further comprising an act of creating a scaled character bit map from the hinted character outline.

4. A method as recited in claim 3, further comprising an act of sending the bit map to a display device.

5. A method as recited in claim 1, wherein the character is a character from an East Asian language.

6. A method as recited in claim 1, wherein the character belongs to multiple semantic character classifications, wherein the one or more classifications include rules to determine if, after one type of hinting has been performed, the resultant character will be altered further.

7. A method as recited in claim 6, wherein said rules are at least partially based on the actual character size and output resolution compared to the reference character size and output resolution.

8. A computer program product comprising one or more computer readable storage media storing computer executable instruction that implement the method recited in claim 1.

9. A computer program product as recited in claim 8, wherein the one or more hinting instructions alter stroke presence for the at least one stroke of the at least one feature of the character.

10. A computer program product as recited in claim 9, wherein the at least one stroke is a vertical stroke.

11. A computer program product as recited in claim 8, wherein the character is a character from an East Asian language.

12. A computer program product as recited in claim 11, further comprising a step for preparing a scaled bit map from the hinted character outline.

13. A computer program product as recited in claim 12, further comprising a step for outputting the hinted character outline to a printer.

14. A computer program product as recited in claim 11, further comprising:
creating a scaled character bit map from the hinted character outline; and
sending the scaled character bit map to an output device.

15. A computer program product as recited in claim 14, wherein the one or more hinting instructions alter stroke location for the at least one stroke of the at least one feature of the character.

16. A computer program product as recited in claim 14, wherein the character belongs to a plurality of semantic character classifications.

17. A computer program product as recited in claim 14, wherein the output device comprises a display device.

18. A computer program product as recited in claim 8, wherein the character belongs to multiple semantic character classifications, wherein the one or more classifications include rules to determine if after one type of hinting has been performed, the resultant character will be altered further.

19. A computer program product as recited in claim 18, comprising an act of executing the one or more hinting instructions based on the actual character size and output resolution relative to the reference character size and output resolution.

20. A method for adding hinting instructions to a set of characters in order to improve a character bitmap produced from an outline of a character in the set of characters at a specified size and output resolution when the character outline is scan converted, the method comprising steps for:
receiving a set of characters to be output, each character comprising a plurality of strokes; and
for each character in the set of characters:
identifying one or more semantic character classifications to which the character belongs, wherein the semantic character classifications each classify corresponding characters that have common features, including one of more strokes, that when modified, do not significantly alter the meaning or legibility of the characters classified by the corresponding semantic character classifications, such that the semantic character classifications are based on semantics of characters rather than mere visual similarity of character strokes;
identifying one or more hinting instructions that are associated with the one or more semantic character classifications for the character, the one or more hinting instructions preserving semantic meaning for the character while altering at least one of a stroke presence or a stroke location for at least one stroke of at least one feature of the character based on a reference character size and output resolution; and
associating the one or more hinting instructions with the character.

21. A method as recited in claim 20, further comprising a step for developing the one or more semantic character classifications.

22. A method as recited in claim 20, wherein the set of characters are one or more characters from an East Asian language.

23. A method as recited in claim 22, wherein the one or more hinting instructions are associated with the character based on a Unicode value for the character.

24. A method as recited in claim 20, wherein the set of characters comprises at least a portion of a font.

25. A method as recited in claim 20, further comprising a step for associating at least one hinting instruction with at least one character of the font that is specific to the at least one character.

26. A computer program product comprising one or more computer readable storage media storing computer executable instructions that implement the method recited in claim 20.

27. A computer program product as recited in claim 26, further comprising an act of defining the one or more hinting instructions for each of the one or more semantic character classifications.

28. A computer program product as recited in claim 26, wherein the set of characters are one or more characters from an East Asian language.

29. A computer program product as recited in claim 26, wherein the character belongs to a plurality of semantic character classifications.

30. A computer program product as recited in claim 26, further comprising an act of defining the one or more semantic character classifications.

31. A computer program product as recited in claim 26, wherein the set of characters are one or more characters from a Latin font.

32. A method of reducing at least one character stroke to improve character legibility for a scaled character bitmap produced from a character outline at a certain size and output resolution when the character outline is scan converted, the method comprising acts of:
defining a character outline that comprises a plurality of strokes and one or more features that each comprises one or more of the plurality of strokes;
defining one or more reference character sizes and output resolutions;
comparing an actual character size and output resolution for the character to the one or more reference character sizes and output resolutions;
classify the character into one or more semantic character classifications that each classify corresponding characters that have common features, including one of more strokes, that when modified, do not significantly alter the meaning or legibility of the characters classified by the corresponding semantic character classifications, and such that the semantic character classifications are based on semantics of characters rather than mere visual similarity of character strokes;
defining one or more hinting instructions for the one or more semantic character classifications that the character is classified in and that preserve semantic meaning for the character, while reducing at least one stroke of at least one feature of the character without altering the character's meaning or legibility to a significant degree, and that are executed if the actual character size and output resolution falls within one of the reference character sizes and output resolutions, as opposed to defining the one or more hinting instructions based on the visual similarity of the character strokes.

33. A method as recited in claim 32, wherein the character outline is a character outline for an East Asian language.

34. A method as recited in claim 32, wherein the one or more reference character sizes and output resolutions are expressed as a target point size and output resolution.

35. A method as recited in claim 32, wherein the one or more reference character sizes and output resolutions are expressed as pixels per em.

36. A method as recited in claim 32, wherein the one or more hinting instructions collapse the at least one stroke if the actual character size and output resolution falls within one of the reference character sizes and output resolutions.

37. A method as recited in claim 36, wherein the at least one stroke is a horizontal stroke.

38. A method as recited in claim 32, wherein the one or more hinting instructions partially collapse the at least one stroke if the actual character size and output resolution falls within one of the reference character sizes and output resolutions.

39. A method as recited in claim 32, wherein the one or more hinting instructions shorten the at least one stroke if the actual character size and output resolution falls within one of the reference character sizes and output resolutions.

40. A method as recited in claim 32, wherein said reducing comprises removing the at least one stroke entirely from the character while preserving the semantic meaning of the character.

* * * * *